April 26, 1960     W. S. WOLFRAM     2,934,335
OIL-AIR PNEUMATIC SPRING SHOCK ABSORBER
Filed May 10, 1956     2 Sheets-Sheet 1
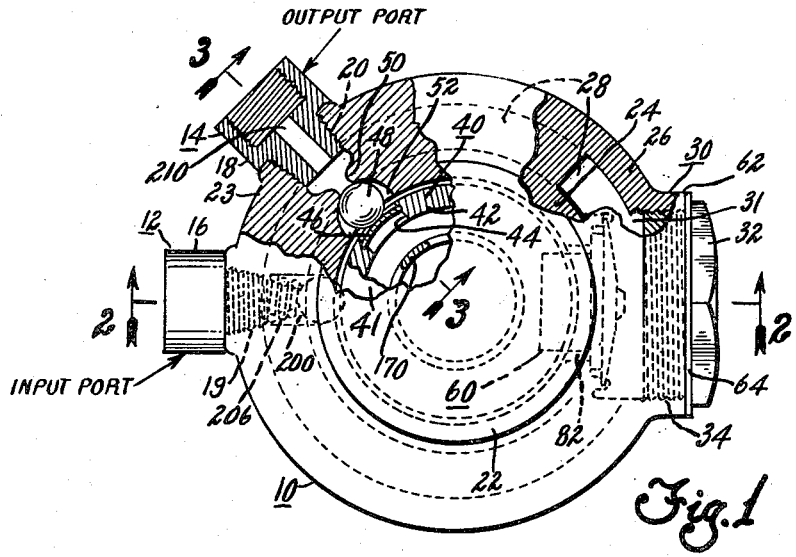
Fig. 1
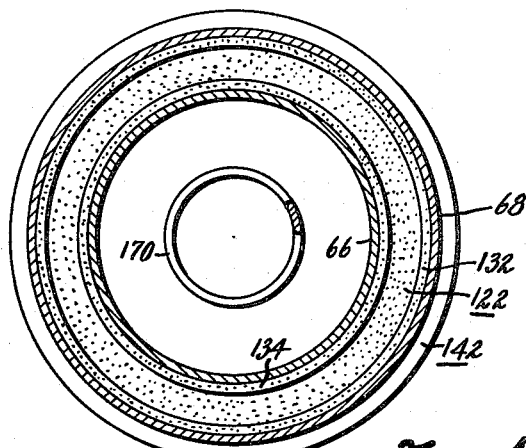
Fig. 4
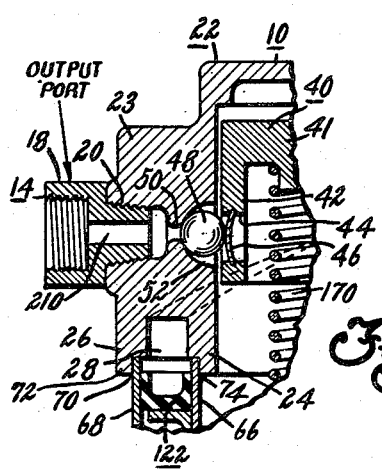
Fig. 3
INVENTOR.
WILLIAM S. WOLFRAM
BY D.C. Staley
HIS ATTORNEY

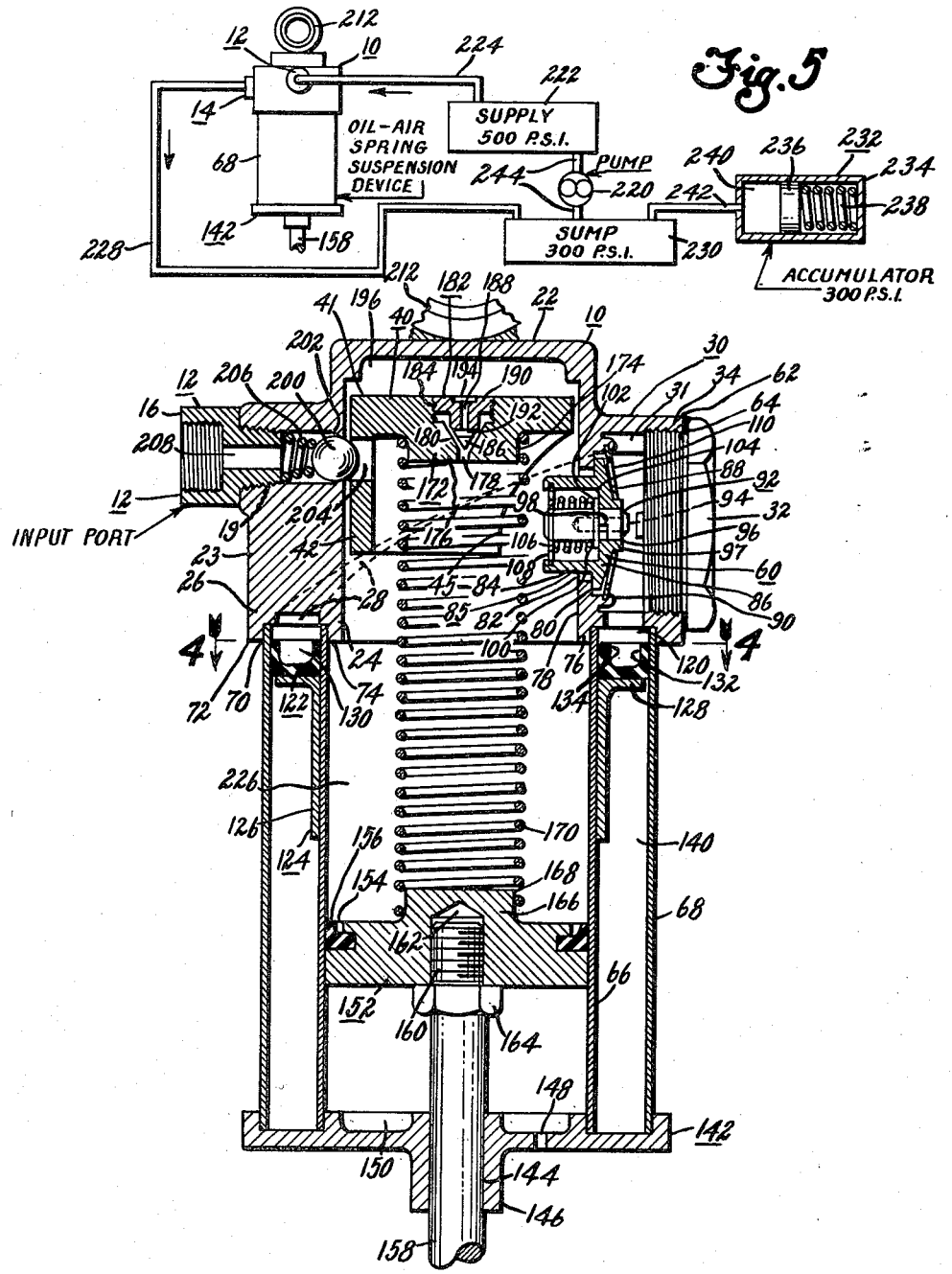

United States Patent Office 2,934,335
Patented Apr. 26, 1960

2,934,335

OIL-AIR PNEUMATIC SPRING SHOCK ABSORBER

William S. Wolfram, Birmingham, Mich., assignor to General Motors Corporation, Detroit, Mich., a corporation of Delaware Application May 10, 1956, Serial No. 584,129

4 Claims. (Cl. 267—34)

This invention relates to suspension devices, and particularly to a combined liquid shock absorber and pneumatic spring for establishing and maintaining a predetermined clearance height between a sprung mass, that is, the body, and an unsprung mass, that is, the axle of a vehicle.

An object of this invention is to provide a suspension device wherein air and a hydraulic fluid are used to maintain a clearance height between an unsprung mass and a sprung mass while providing a resilient ride utilizing a column of air retained concentrically about the suspension device to absorb and exert forces in opposition to road-condition-caused forces or shocks transmitted through the unsprung mass to fluid in the suspension device.

Another object is to provide a suspension device capable of maintaining clearance height between a sprung and an unsprung mass using a hydraulic fluid to provide support inside the device in cooperation with a damped member subject to forces encountered by the device between the unsprung mass and sprung mass for actuating a variation in the amount of fluid provided in the device.

Another object is to provide apparatus in accordance with the foregoing objects that includes a supply of fluid maintaining a predetermined clearance between a body and an axle with a resilient connecting means having a normal predetermined length conveying oppositely directed forces in returning to its normal predetermined length to a damping member for controlling variation in the amount of fluid provided in the device.

Another object is to provide apparatus in accordance with the foregoing objects wherein air and a hydraulic fluid are used to maintain a clearance height between sprung and unsprung masses with a suspension device provided with an annular cup-like separation between air and fluid at one end of the column of air located concentrically with the suspension device transmitting forces exerted and absorbed by gaseous pressure of the air column in opposition to loading and road-condition-caused forces transmitted through the unsprung mass to the oil in the suspension device.

A further object is to provide apparatus operably connected with a suspension device of the type in the present invention wherein air and hydraulic fluid are used to maintain a clearance height between a sprung mass and an unsprung mass using a pump providing fluid under pressure supplemented by an accumulator boosting the fluid pressure to a constant minimum value at all times to establish and maintain a predetermined clearance height between a vehicle body and its running gear.

Further objects and advantages of the present invention will be apparent from the following description, reference being had to the accompanying drawings, wherein preferred embodiments of the present invention are clearly shown.

In the drawings:

Fig. 1 is a partially sectioned end view of a suspension device in accordance with the present invention.

Fig. 2 is a cross-sectional elevational view of the suspension device taken along line 2—2 of Fig. 1.

Fig. 3 is a fragmentary cross-sectional elevational view taken along line 3—3 of Fig. 1.

Fig. 4 is a cross-sectional view taken along line 4—4 of Fig. 2.

Fig. 5 is a schematic representation of a fluid system supplying actuating fluid to the suspension device of the present system.

With particular reference to Fig. 1, a suspension device in accordance with the present invention is shown comprising an end closure member or mounting means, generally indicated by the numeral 10, which provides an input port 12 and an output port 14. The end closure member is suitably threaded about ports 12 and 14 as shown at 19 and 20 to receive input and output port fittings 16 and 18, respectively. The cutaway portion of Fig. 1 shows a body portion 22 and a solid annular wall 23 of the mounting means 10 connected with a pair of downwardly extending annular elements or skirts 24 and 26 which provide an annular groove, channel passage, or space 28 therebetween, the purpose of which will be described in further detail below. The annular space 28 is formed in a truncated cylindrical fashion such that the groove forming the skirts 24 and 26 slants upwardly inside one half of the body portion 22 of the mounting means 10. The space 28 slants downwardly in the other half such that the input port 12 and output port 14 are formed in the solid annular wall 23 of the body portion 22 without interference from the space 28. The mounting means 10 is also formed with a radially extending boss, or recess, portion 30 attached to body portion 22 and located diametrically opposite the input and output ports. The boss, or recess, 30 provides a space 31 that communicates with the annular space 28 formed between skirts 24 and 26. A plug 32 suitably screwed into engagement with a threaded portion 34 on the inner periphery of the boss portion 30 closes off the outer periphery of the chamber or recess portion 30 where the outer skirt 26 is modified to provide an access opening to the inside of mounting means 10 upon removal of the plug 32. The inner skirt 24 continues in its annular shape to form an annular seat for valving about an opening 82 therein to be described in further detail below.

Also shown in Fig. 1 is a partially sectioned view of a valve-actuating member or reciprocable cup generally indicated by the numeral 40 having a head portion 41 and a skirt portion 42 provided with a slot or aperture 44 radially in alignment with the output port 14. The aperture 44 in the skirt 42 has a peripheral groove into which a disc spring 46 is snapped providing a resilient biasing means for a ball member 48 of a valve mechanism against a valve seat 50 formed in the wall 23 with the output port 14. When the valve actuating member 40 is maintained within a predetermined position corresponding to the desired clearance height to be established and maintained by the suspension device between an unsprung mass and a sprung mass, the aperture 44 of skirt 42 is in alignment with the valve seat 50. There is a drilled-out portion or annular recess 52 in the annular wall 23 of the mounting means 10 in which the ball member 48 is movable into and out of sealing engagement with the valve seat 50. When proper clearance height is established, all edges of aperture 44 are free of engagement with ball 48 permitting it to engage seat 50 so that the output port 14 is completely closed off to escape of fluid from inside the suspension device. The spring 46 biases the ball member 48 radially outwardly against the seat 50. The annular space 52 can be formed by inserting a boring tool through the boss, or recess-forming structure 30 and opening 82 of skirt portion 24 when the plug 32 is removed. The dotted lines of Fig.

1 indicate a two-directional valving operable to open passage in response to shock forces transmitted to the suspension device for permitting an absorbing or counter force action to be transmitted in opposite directions. This shock absorber valving, generally indicated by the numeral 60, is disposed in the radial opening 82 formed in the inner skirt 24 adjacent the boss portion 30 in communication with the space 31 and groove 28. The skirt portion 42 of valve actuating member 40 has a peripheral cutaway portion 45 so that the valve actuating member 40 is free of engagement and interference with shock absorber valving 60 at all times.

Fig. 2 shows the mounting means, generally indicated by the numeral 10, with input port 12 and other structure in considerable further detail. The boss portion 30 can be seen formed with a cylindrical, radially outwardly extending end portion 62 formed with the body portion 22 of the mounting means 10. The plug 32 is threaded into engagement with the inner periphery of end portion 62 having a sealing means 64 disposed between the peripheral shoulder portions of the plug 32 and the annular end portion 62 of the boss portion 30. The dotted lines representing groove 28 are shown at first proceeding from a shallow part of the groove formed at one side of the mounting means 10 below the annular wall 23 in which the valve ports 12 and 14 are provided and then proceeding upwardly in the manner of a truncated cylinder to a deep part of groove 28 at the top peripheral edge of the space, or chamber 31 within boss 30. The space 28 forms an annular recess extending about the entire lower periphery of the mounting means 10 capable of permitting fluid communication with space provided or formed between an inner cylinder 66 and an outer cylinder 68 attached to the mounting means 10. The outer cylinder 68 is soldered or otherwise suitably attached to mounting means 10 along a joint 70 formed between a downwardly extending flange 72 along the lower periphery of the outer skirt 26 of the mounting means 10. The inner cylinder 66 is also soldered along a joint 74 formed therewith by an annular flange 76 extending downwardly from the inner skirt portion 24 of the mounting means 10.

As mentioned above, the inner skirt 24 extends annularly forming a wall portion 78 providing a seat 80 about the aperture 82 is proximity to the boss, or recess, portion 30 with chamber 31 inside the plug 32. The opening 82 is formed with a diameter sufficiently large to admit a cylindrical portion 84 of the shock absorber valving assembly, indicated generally by the numeral 60. The cylindrical portion 84 of one shock absorber valve member 85 is attached to a flange portion 86 engageable along the outer edge thereof with the seat 80 to form a shock absorber valve operable in one direction. A spring disc 88 is snap fitted into a groove of a shoulder 90 extending longitudinally of the cylindrical structure forming boss portion 30 so that the flange portion 86 of valve member 85 is normally biased into sealing engagement with the seat 80.

The shock absorber valving is provided with another valve member 92 formed with a longitudinally extending bore 94 which extends through a central aperture 96 formed through a central shoulder 97 on the flange portion 86 of valve member 85. The valve member 92 is formed with a radially extending cutaway portion, or slot, 98 extending radially outwardly from one side of the bore 94 in member 92 such that a spring 100 normally biases a flange portion 102 of the member 92 into seating engagement with a seat 104 formed at one side of the shoulder portion 97 about the aperture 96 of valve member 85. The spring 100 is compressed between the flange 102 of member 92 and a disc 106 fitted into an annular groove about the inner periphery of one end of the cylindrical portion 84 of valve member 85. The disc 106 is provided with suitable openings or apertures 108 to permit fluid flow therethrough. As long as the fluid pressure on the bore side of the valve member 92 is insufficient to further compress the spring 100, the valve member 92 is seated with the flange 102 against the seat 104 preventing fluid communication through the bore 94 and the radial slot 98 through the opening 108 in the disc 106. To permit fluid flow in the opposite direction, the spring disc 88 is slotted or apertured at 110. Fluid can flow around the flange 86 when valve member 85 is biased by the fluid pressure against the spring disc 88 away from the seat 80 formed peripherally about the opening 82 in the inner skirt 24.

As shown in Fig. 2, the inner cylinder 66 and outer cylinder 68 are located concentrically with respect to each other to form an annular chamber 120 adjacent the space 28 formed between the inner skirt 24 and outer shirt 26 of the mounting means 10. A sealing means, or double-lipped seal, 122, having a cup-like annular structure separates a column of air from a column of oil and is bonded or secured to a cylindrical guide member 124. The guide member 124 is formed having an annular portion 126 reciprocally movable along a peripheral portion of the inner cylinder 66 and a flange portion 128 extending radially outwardly between the inner cylinder 66 and the outer cylinder 68. The cylindrical or annular portion 126 of guide 124 could also be reciprocally disposed to move along a peripheral surface of the outer cylinder 68. The flange portion 128 of the guide 124 provides a fastening platform or support to which the sealing means 122 may be attached or bonded. The sealing means 122 is provided with an annular channel or groove 130 forming an outer lip 132 in sealing engagement with the outer cylinder 68 and an inner lip 134 in sealing engagement with the inner cylinder 66. Thus, the sealing means 122 has a double-lip seal operative upon opposing surfaces of the inner cylinder 66 and outer cylinder 68 preventing leakage from the annular chamber 120 to an annular chamber 140 formed between the inner cylinder 66, outer cylinder 68 and an end cap 142 on the side of the sealing means 122 opposite the chamber 120. The end cap 142 is attached to the cylindrical members 66 and 68 by soldering at joints formed between the cylinders and end cap 142 in a manner similar to the juncture between the cylinders and mounting means described above.

The end cap 142 is provided with a central aperture 144 in a guide portion 146. A vent 148 is formed in end cap 142 communicating with a chamber 150 within the inner cylinder 66. The chamber 150 is formed inside the inner cylinder 66 between the end cap 142 and a piston or plunger 152 reciprocally disposed within the inner cylinder. The plunger 152 is provided with an annular groove 154 for receiving and securing a sealing means 156 disposed between the plunger 152 and the inner cylinder 66. A plunger rod 158 having a threaded portion 160 is fitted into engagement with a threaded bore 162 of the plunger 152. The rod 158 is locked into engagement therewith by a nut 164.

The structure of the concentric inner cylinder 66 and outer cylinder 68 cooperating with the mounting means 10 provides chamber space for opposing columns of air and fluid retained concentrically within the suspension device. The shock forces are transmitted through vehicle running gear to the plunger 152 and then through interchange of hydraulic fluid through passages opened in the shock absorbing valving 60. Within a predetermined magnitude range such forces are absorbed by interaction of air and fluid columns on opposite sides of the sealing means 122. Beyond this predetermined range the suspension device is mechanically able to establish and maintain a clearance height position between an unsprung mass and a sprung mass in accordance with forces conveyed through the plunger 152 to valve actuating member 40. The following structure connects the plunger 152 and valve actuating means 40 for this purpose. The plunger 152 has an upwardly extending annular portion 166 provided with an outer cylindrical surface 168 onto which a spring or resilient means 170 is tightly fitted for movement therewith. The opposite end of the spring 170 is attached to an annular portion or anchor 172 similar to anchor 166. Anchor 172 has an annular cylindrical surface 174 formed with the valve actuating member 40 for tightly engaging the spring 170. The spring 170 is shown also in the fragmentary sectional view of Fig. 1 and operates to exert forces in opposite directions as described below.

The spring or resilient means 170 is formed to retain a predetermined length and exert axial forces in a pushing or pulling relation between plunger 152 and valve actuating member 40 in returning to that length. The resilient means 170 may thus be called a push-pull spring having a predetermined length corresponding and proportional to the predetermined clearance height to be established and maintained by the suspension device between the body and its running gear. The diameter of valve actuating member 40 is slightly less than the diameter of the inner peripheral surface of the inner annular skirt 24 so that fluid may pass slowly between the inner peripheral surface of skirt 24 and valve actuating member 40. Once having passed to above the head portion 41 of the valve actuating means, the fluid is used in a damping action provided by the following structural features. Fig. 2 shows how the main body or head portion 41 of the valve actuating member 40 is provided with a centrally located metering or damping orifice 179 formed with a conical seat 180. An adjustable damping needle valve member 182 is threaded into engagement with the valve actuating member 40 along threads 184. The needle valve member 182 is provided with a conical portion 186 adjustable with the conical surface of seat 180 in the main body portion 41 of the valve actuating member 40. A longitudinally extending bore 188 is drilled axially in a body portion 190 of the needle valve member 182 and communicates with a transverse passage 192 drilled in the conical portion 186 of the needle valve 182. A tool socket or slot 194 may be provided to adjust the positioning of the needle valve 182 for varying the clearance between the mating surfaces of the conical portion 180 of leveling piston 40 and the conical portion 186 of the needle valve for various damping actions of the valve actuating member 40. As mentioned above, the valve actuat-member 40 provides an annular clearance relative to the inner periphery of mounting means skirt 24. The inner peripheral surface formed by the inner cylindrical skirt 24 extends above the leveling member to form a recess or damping chamber 196 with the valve actuating member 40 inside the body portion 22 of the end closure member or mounting means 10. The damping effect resulting from the structure just described generally limits the movement of the valve actuating member to a range not resulting in opening of the input or output ports so that a predetermined clearance height is maintained by the suspension device between sprung and unsprung masses.

As shown clearly in Fig. 2, the input port 12 is provided with a valve mechanism similar to output port 14 and including a ball member 200 biased into engagement with a seat 202 formed in the annular portion or wall 23 adjacent a slot or aperture 204 provided in the skirt 42 of the leveling member 40. The ball member 200 is biased into engagement with the seat 202 by a compression spring or resilient means 206 disposed between the ball member 200 and the fitting 16 suitably apertured at 208 to form a passage for the input port 12.

The opening 204 in skirt portion 42 is slightly larger in size than the diameter of the ball member 200 immediately adjacent the opening 204 for a purpose described in further detail below. The opening 44 in skirt portion 42 of leveling member 40 is similarly slightly larger in size than the diameter of ball member 48 immediately adjacent the opening 44 for a similar purpose.

Fig. 3 shows the structure of the output port 14 and accompanying valve mechanism in a fragmentary elevational sectional view taken along line 3—3 of Fig. 1. Reviewing briefly, the slot, or aperture, 44 formed in the skirt 42 of the valve actuating member 40 is adjacent the ball member 48 engageable on the seat 50 formed in the annular portion or wall 23 of the mounting means 10. The spring disc 46 can be seen biasing the ball member 48 into normal engagement with the seat 50. It is obvious that the ball member 48 is biased radially outwardly whereas the ball member 200 of the input port 12 is biased radially inwardly. The valve mechanisms including balls 48 and 200 are longitudinally and angularly separated from each other in the solid wall 23 of mounting means 10.

The openings 44 and 204 in the skirt 42 are formed slightly larger than the diameters of the ball members 48 and 200 adjacent the apertures 44 and 204 for the following purpose. The clearance between the diameters of the ball members 48 and 200 and aperture 44 for the output port 14 and aperture 204 for the input port 12, respectively, permits the predetermined limited damping movement of the valve actuating member 40 before the valve mechanism for either the input or output port is actuated to alter the body to axle clearance height. Only when the height of the suspension device is changed by pushing or pulling forces from spring 170 exceeding the range of the normal damping movement will the top edge of slot 44 nudge output ball valve member 48 off of its seat 50 or the lower edge of slot 204 nudge input ball valve member 200 off of its seat 202. If the body to axle clearance height maintained by the suspension device is too long, the top edge of slot 44 nudges output ball 48 off its seat. If the body to axle clearance height maintained by the suspension device is too short, the lower edge of slot 204 nudges input ball 200 off its seat. Thus, the median position represented by the halfway point of the clearance distance of the apertures 44 and 204 relative to the exact diameter of the ball members immediately adjacent the edges of the apertures in the skirt 42 of the leveling piston provides a neutral or non-actuating positioning of the valve actuating member 40 relative to the sealing positioning of the ball members on their respective seats. As long as the valve actuating member 40 remains in this neutral or level position and within the predetermined damping range, the ball members 48 and 200 will not be urged or removed from engagement with their seats. The damping orifice 178 in the body portion 176 of the leveling member 40 is adjusted to prevent movement in excess of the predetermined damping range of the leveling member 40 except when a large change in the clearance height position of the member 40 occurs due to push-pull movement transmitted thereto by means of the push-pull spring 170. The plunger rod 158 can be attached to a movable suspension member (not shown) in a conventional manner and the body portion 22 of the mounting means 10 can be attached by a suitable bracket such as represented by a clip or ring 212 shown in Fig. 2 to a vehicle body (also not shown).

Fig. 4 is a cross-sectional view taken along line 4—4 of Fig. 2 showing the double-lipped annular seal 122 with the inner and outer cylinders in the present invention. Fig. 4 shows the end cap 142 to which the outer cylinder 68 is bonded with the lip 132 of the sealing means 122 engaging the inner annular periphery of the outer cylinder 68 in sealing engagement together with the inner lip 134 of the sealing means 122 in sealing engagement with the inner cylinder 66. The push-pull spring 170 is shown located concentrically within the outer cylinder 68 and the inner cylinder 66 but other structural details have been omitted for purposes of clarity.

Fig. 5 shows the subject air-oil pneumatic spring shock absorber or suspension device connected in a fluid pressure system with the mounting means 10 and outer cylinder 68 attached with the end cap 142 as described above. The input port 12 and output port 14 provide fluid communication in the system as indicated by the arrows. The rod 158 connected with the plunger is shown extending through the end cap 142 and the fastening clip, or ring, 212 is shown attached to the mounting means 10 for mounting to a fixed member or vehicle body (not shown). The system comprises a source of fluid pressure or pump 220 pumping fluid to a supply tank, generally indicated by the numeral 222, and forcing it through a conduit 224 to the input port 12 of the combination oil-air pneumatic-spring shock absorber of the present invention.

In operation, assuming the ball member 200 of the input port 12 is dislocated from its seat 202 because the axle to body height of the suspension device is too short, fluid will be admitted into the space 226 (see Fig. 2) between the plunger 152, the inner cylinder 66 and the valve actuating member 40. Adding fluid to the space 226 will cause the plunger or piston 152 to move to an extend position until the force transmitted from the plunger 152 through the push-pull spring 170 to the valve actuating member 40 is such that the aperture, or slot opening, 204 in the skirt 42 has returned to a neutral position at which the ball member 200 returns to sealing engagement on its seat 202 at the proper axle to body clearance height of the suspension device.

Assuming now that the axle to body clearance height of the suspension device is too long, a force is conveyed from the plunger 152 to the valve actuating member 40 through spring 170 considerably greater than the force which may be absorbed by the damping action of the metering orifice 178 formed with the adjustable needle valve 182. The leveling member 40, then is moved or pulled downwardly through the push-pull connecting means or spring 170 which maintains its predetermined length such that the top edge of the opening 44 in the skirt 42 nudges the ball 48 from its seat 50 thereby opening the output valve mechanism until proper axle to body clearance height is restored.

When the output ball 48 is unseated, fluid may escape from the chamber 226 through the passage 210 of the fitting 18 for the output port to pass through a conduit 228 which returns the fluid to a sump 230 shown in Fig. 5. The sump is maintained at a minimum pressure, such as 300 p.s.i., for example, by means of an accumulator, generally indicated by the numeral 232. The accumulator 232 is provided with a housing 234 and a piston 236 reciprocal therein preloaded by a compression spring 238 to maintain a minimum pressure, such as the 300 p.s.i., in a chamber 240 communicating through a conduit 242 with the sump 230. Providing the spring-loaded accumulator 232 permits use of a simple pressure source or pump 220 which forces the fluid from the sump 230 through a conduit 244 connecting the sump 230 and supply 222. The accumulator serves to boost the pressure in the supply to 500 p.s.i., for example (accumulator 300 pi.s.i. and pump 200 p.s.i.) so that sufficient pressure is available to raise and lower, or extend and retract, the plunger 152 within the combination air-oil pneumatic spring shock absorber of the present invention.

As alluded to hereinbefore, the valve actuating member 40 will only move to dislocate the ball members 48 and 200 of the output and input ports, respectively, when the force transmitted through the plunger 152 by means of the push-pull spring 170 is sufficiently greater than the damping action provided by the needle valve 182 and orifice 178 around the periphery of the skirt and body portion of the valve actuating member 40. Whenever the force transmitted through the push-pull spring 170 is not sufficiently great to overcome this damping action, the ball members 48 and 200 will remain in sealing engagement with the seats provided therefor and an equalization of shock forces occurs utilizing the shock absorbing valving, generally indicated by the numeral 60, to open oppositely directed passages permitting the concentric oil and air columns to absorb small forces and deflecting actions transmitted through the rod 158 to the plunger or piston 152. For example, a slight shock may occur causing a retract movement of the plunger 152, such that fluid which cannot be compressed appreciably is forced from the chamber 226. Since this slight force will not be sufficient to exceed the predetermined damping movement of valve actuating member 40, the fluid will dislocate the flange portion 86 of shock absorber valve 85 from the seat 80 of the inner skirt 24 permitting fluid flow through the opening 82 of the skirt 24 about and through the apertures 110 of the spring disc 88 normally biasing the flange portion 86 to a seating engagement with the seat 80. The fluid is now admitted into the space 31 within the boss, or recess, portion 30 and due to the truncated cylindrical space 28 formed between the outer skirt 26 and inner skirt 24, the fluid acts exerting forces perpendicularly upon the sealing means 122 adjacent the annular chamber portion 120 formed between the inner cylinder 66 and outer cylinder 68. Chamber 120 contains a concentric and coaxial column of oil or hydraulic fluid. The sealing means 122 separates the chamber 120 containing the fluid from chamber 140 containing an annular column of air compressible to absorb the shock transmitted concentrically, coaxially and vertically thereto from the fluid forced by plunger 152 through the shock absorbing valving 60. The cutaway portion 45 of skirt 42 on the valve actuating member 40 is complementary to valving 60 to avoid interference therewith.

Similarly, when the shock transmitted through the rod 158 to the plunger 152 in an extend or downward direction is not sufficiently great to exceed the predetermined force necessary to overcome the neutral positioning maintained by the damping means of valve actuating member 40, the air compressed in the annular chamber 140 between the inner cylinder 66 and the outer cylinder 68 will force the guide means 124 to which the sealing means 122 are bonded upwardly. Then oil or fluid will be forced coaxially, concentrically and vertically from the annular column in chamber 120 through the truncated cylindrical passage 28 into space 31 within boss portion 30. Oil or fluid is next forced into the longitudinally extending bore 94 of valve member 92 of shock absorbing valving 60 to move the member 92 against the bias of compression spring 100 thereby unseating the flange portion 102 from the seat 104. Fluid flow is channeled through the bore 94 and slot 98 back to the chamber 226 through the openings 108 in the disc 106 snap fitted into engagement with cylindrical portion 84 of valve 85 to hold the spring against the shoulder 102 of member 92.

While the embodiments of the present invention as herein disclosed, constitute preferred forms, it is to be understood that other forms might be adopted.

What is claimed is as follows:

1. An air-oil spring and shock absorber for placement between the sprung mass and the unsprung mass of a vehicle, comprising, rigid wall means forming inner and outer concentric cylinders thereby forming a central cylindrical liquid receiving chamber and an annular outer chamber, an annularly arranged member positioned in said outer chamber between said cylinder walls sealingly engaging the same separating the space between the cylinder walls into first and second chambers and reciprocable in an axial direction, an end closure member at one end of said cylinder walls closing the open end of said first chamber and forming with said annular member a closed gas pressure chamber, a liquid displacement member reciprocable in said central chamber, a second end closure member at the opposite end of said cylinder walls closing the open end of said second chamber and one end of said central chamber and forming with said annular member and with said liquid displacement member liquid filled spaces, dual acting flow resistance valve means between said second chamber and said central chamber for restrictive control of transfer flow of liquid between said second chamber and said central chamber on reciprocation of said liquid displacement member in said central chamber whereby to achieve absorption of shock forces, said annular member reciprocating against gas pressure in said first chamber as caused by said transfer flow of liquid to achieve resilience in suspension of the vehicle, said second closure having a recess chamber therein open to and aligned with said central chamber, valve actuating piston means slidable in said recess and drivingly connected with said liquid displacement member by extensible and contractable means having a predetermined normal relaxed length positioning said valve actuating piston means in a predetermined position in said recess with said liquid displacement member in a normal static position in said central cylinder, and valve means carried by said second closure and engageable alternately by said valve actuating piston means on movement in alternate directions from its predetermined position by movement of said displacement member in alternate directions from its normal static position, said valve actuating piston means including means to retard movement thereof relative to movement of said liquid fluid displacement member.

2. An air-oil spring and shock absorber for a vehicle constructed in accordance with claim 1 wherein said first-mentioned end closure member also forms a guide member at one end of said cylinder walls for rod means extending exteriorly of said central chamber from said liquid displacement member.

3. An air-oil spring and shock absorber for placement between the sprung mass and the unsprung mass of a vehicle, comprising, rigid wall means forming inner and outer concentric cylinders forming thereby a central cylindrical liquid receiving chamber and an outer annular chamber, an annular piston member positioned in said outer chamber engaging said cylinder walls reciprocably slidable thereon and separating the said outer annular chamber into first and second chambers, an end closure memer at one end of said cylinder walls closing the open end of said first chamber and forming with said annular member a closed gas pressure chamber, a liquid displacement member reciprocable within said central cylinder, a second end closure member at the opposite end of said cylinder walls closing the open end of said second chamber and one end of said central cylinder and forming with said central cylinder and said second chamber liquid filled spaces, said second closure member having an open ended recess chamber therein coaxial with said central chamber, dual acting flow resistance valve means in said second closure member between said recess and said second chamber for resistance control of transfer flow of liquid between said central chamber and said second chamber on reciprocation of said liquid displacement member in said central chamber whereby to achieve absorption of shock forces, said annular piston member reciprocating against gas pressure in said first chamber as caused by said transfer flow of liquid to achieve resilience in suspension of the vehicle, valve actuating piston means slidable in said recess in said second closure and drivingly connected with said liquid displacement member by contractable and extensible means having a predetermined normal relaxed length positioning said valve actuating piston means in a predetermined position in said recess with said liquid displacement member in a normal static position in said central chamber, and inlet and exhaust valve means in said second closure engaged by said valve actuating piston means on alternate movement thereof for inlet or exhaust of liquid respectively in said liquid filled space on displacement of said valve actuating piston means in one direction or the other respectively from its predetermined position by movement of said displacement member in one direction or the other respectively from its normal static position, said valve actuating piston means incorporating damping means to retard movement of the piston means relative to movement of said liquid displacement member.

4. An air-oil spring and shock absorber arranged in accordance with the structure of claim 3 wherein said valve actuating member includes a restrictive fluid flow passage between said central chamber and a chamber formed by cooperation of said valve actuating member and one end of said recess to provide for restrictive flow of fluid therebetween to damp movement of said valve actuating member and thereby prevent said valve actuating member following directly reciprocable movement of said oil displacement member.

References Cited in the file of this patent

UNITED STATES PATENTS

| | | |
|---|---|---|
| 1,037,730 | Cowey | Sept. 3, 1912 |
| 2,042,371 | Warren | May 26, 1936 |
| 2,101,757 | Schumacher | Dec. 7, 1937 |
| 2,361,575 | Thompson | Oct. 31, 1944 |
| 2,461,066 | Kent | Feb. 8, 1949 |
| 2,536,626 | Coleman | Jan. 2, 1951 |
| 2,721,446 | Bumb | Oct. 25, 1955 |

FOREIGN PATENTS

| | | |
|---|---|---|
| 1,076,192 | France | Apr. 21, 1954 |